United States Patent [19]
Reynolds de Sousa et al.

[11] Patent Number: 5,595,054
[45] Date of Patent: Jan. 21, 1997

[54] MECHANICAL TREE SHAKER FOR FRUIT HARVESTING

[75] Inventors: Domingos P. Reynolds de Sousa, Rua Heliodoro Salgado; Pedro J. Vieira Correia de Oliveira, Caxias, both of Portugal

[73] Assignee: Reynolds & Oliveira-Empress de Projectos e Comercializacao de Maquinas, R&O, LDA, Estremos, Portugal

[21] Appl. No.: 302,103

[22] Filed: Sep. 7, 1994

Related U.S. Application Data

[63] Continuation-in-part of Ser. No. 35,470, Mar. 23, 1993.

[30] Foreign Application Priority Data

Apr. 24, 1992 [EP] European Pat. Off. ............. 92670003

[51] Int. Cl.⁶ .................................................. A01D 46/00
[52] U.S. Cl. .................................................. 56/340.1
[58] Field of Search .......................... 56/328.1, 340.1, 56/329

[56] References Cited

U.S. PATENT DOCUMENTS

| | | | |
|---|---|---|---|
| 3,077,721 | 2/1963 | Balsbaugh | 56/340.1 |
| 3,120,091 | 2/1964 | Gould et al. | |
| 3,206,919 | 9/1965 | Read | 56/340.1 |
| 3,392,517 | 7/1968 | Nye | 56/340.1 |
| 3,494,654 | 2/1970 | Gould et al. | |
| 3,509,702 | 5/1970 | Rickerd | |
| 3,548,578 | 12/1970 | Shipley, Jr. | 56/340.1 |
| 3,594,999 | 7/1971 | Savage | 56/340.1 |
| 3,650,099 | 3/1972 | Sitter | 56/340.1 |
| 3,696,597 | 10/1972 | Sitter | |
| 3,924,390 | 12/1975 | Alexander | 56/340.1 |
| 4,893,459 | 1/1990 | Orlando | |

FOREIGN PATENT DOCUMENTS 1109087 8/1984 U.S.S.R. ............................ 56/340.1

*Primary Examiner*—James A. Lisehora
*Attorney, Agent, or Firm*—Morrison & Foerster

[57] ABSTRACT

The low power agricultural mechanical tree shaker for fruit harvesting using phase-controlled linear impact vibrations includes an adjustable springs set (FIG. 3) (8) that connects the vibrator set (FIG. 1) (1) to the clamp/trunk or limb set (FIG. 1) (4) (FIG. 5) through the guiding system (FIG. 3) (9, 10, 18, 19) and allows to set the spring tension for resonance vibration after attaching the shaker to a particular tree. Consequently, the vibration of the shaker set will have an adjustable phase angle between the shaker set and the clamp/trunk or limb set, between 0° and 360°. The clamp has the form of a fork (FIG. 5) and includes a set of vulcanized asymmetric grips (FIGS. 3 and 5) (15), a vulcanized chains set (FIG. 5 (17), for the attachment of the clamp to the tree.

10 Claims, 9 Drawing Sheets

MECHANICAL TREE SHAKER FOR FRUIT HARVESTING

This application is a continuation-in-part of application Ser. No. 08/035,470, filed Mar. 23, 1993, now abandoned.

FIELD OF THE INVENTION

The present invention relates to an agricultural mechanical shaker for fruit harvesting using phase-controlled linear impact vibration, transmitted to the tree's major trunk and/or limbs, by means of an excitable rod wherein are coupled two sets of eccentric masses selfcompensated in their component perpendicular to the director of the vibration.

DESCRIPTION OF THE PRIOR ART AND ACTUAL STATE OF THE ART

The fruit's tree shaking technology has begun in California around 1964, by the shaking on nuts and olive trees. The present inertia shakers commercially available have been developed since the early 70's.

Shaking by inertia, disclosed and used all over the world, is effective in most cases, although higher power vibrations are necessary (80Hp–110Hp).

This type of vibration is carried out by the superposition of the frequencies produced by 2 or 3 wheels with concentric or parallel axis, with eccentric masses that rotate typically with a frequency between 18 and 40 Hz, producing an acceleration in the peduncle's fruits, separating them from the trees, being a two-dimensional vibration in a plane perpendicular to the vibrating tree trunk and/or limb.

There is also another type of inertia shakers, which, as they are much more simple and cheap, provide their use in small orchards with consequences in the fruit removal efficiency, operation speed and damage of the propulsor vehicle, in most cases. Usually this kind of shakers takes on account the vehicles' mass that impels them to absorb the vibrations not absorbed by the tree, and, in most cases, they only vibrate the tree limbs. This type of inertia vibration is linear and it is provided by the traction of a cable connected to a piston rod-handle system or just by the vibration produced by an eccentric mass in rotation, being irrelevant the frequency's pattern.

On the other hand, impulse or impact shakers, that transmit an impulse or impact to the tree's trunk and/or limb, have been studied in Europe and U.S.A. Such shakers are directed to more specific aspects, such as apple harvesting or multitrunk olive tree harvesting. Such devices shake the tree with 1 or 2 impulses or impacts; they generate and drive the impulse to the tree itself by means of a rigid shaker tree connection. In this way, there is no shaker displacement relatively to the tree, which means that these devices don't take advantage of the vibration characteristics of the tree itself.

As a matter of fact, all the shakers hereinabove described use forced vibration to shake tree, not taking advantage of the trees' own vibration frequencies.

DISCLOSURE OF THE INVENTION

The present invention is directed to the solution of some shortcomings related of the kind of shakers referred to in the previous chapter. The present invention provides new solutions and uses vibration parameters, phase-controlled impact vibration, allowing the creation of a practical agricultural device, that can be used by tractors and motorized vehicles with more than 20 Hp, with a simple design providing an easy maintenance and low price, efficient and profitable technologic conception (regarding the isolation of the vibration to the tractor or motorized vehicle that carries it), the preservation of the trees and the vertical fruit fall.

The phase-controlled impact shaker of the present invention has the same operating philosophy as the conventional multi-directional inertia shakers well known in the art. That means that it is mounted on a propulsor vehicle (agricultural tractor or other) that as attached a structure that suspends the shaker itself in order not to transmit vibrations to the vehicle during shaking.

Typically, the shaker is mounted in the front of the vehicle in order to allow good operation visibility. To shake is to perform the same type of operations as well as known in prior art, that means to grab the tree by closing the clamp, and to shake the tree by producing impacts on the tree created by rotation of eccentric masses. While conventional shakers or prior art use inertia shaking, being result of a single or combination of several sinusoidal oscillating forces that begin in 0 force and increases up to a desirable max. force, this shaker uses impact forces to shake, that means an instant sharp transition from 0 force to max. force without transition forces in between. So to shake is to give a series of peak forces, or impacts, in the tree.

When the shaking apparatus is clamped to the tree trunk or limb one as two distinct entities vibrating in resonance or with a variable vibrating phase angle between them. The two distinct entities are:

the vibrator, that produces linear vibrating forces on the direction of the tree.

the clamp/trunk or limb (that form only one entity), that receive impacts from the vibrator and vibrates at its own frequencies.

There is no physical link between this entities except a traction spring to put the vibrator close to the clamp/trunk or limb entity and a guiding system to obligate the vibrator to give the impacts always on the same place in the clamp. Because of an effective displacement between vibrator and the clamp/trunk or limb, at max. amplitude of phase angle, the traction spring is used to pull the tree back to the vibrator, otherwise it would be difficult to control the phase angle, not allowing a uniform shaking action. So the traction spring is of big importance to produce an attraction force, or a recuperating force, between vibrator and clamp/trunk or limb entities. The regulation of the spring tension will allow the adjustment of the phase angle between the referred two entities.

The tree shaker apparatus is composed by 3 sets of elements that are on the basis of the phase-controlled impact shaking, namely the vibrator set, the spring set with the guiding system, and the clamp/trunk or limb set.

The present invention allows the use of lower shaking power (5 Hp to 20 Hp) with equal or greater efficiency in the fruit fall comparing with the inertia shakers. It provides a higher cadency of vibration, equal or superior to the inertia shakers, as the impact vibration yields fruits fall in the first 3–4 impacts. It provides a greater efficiency in fruits fall comparing with the other shakers, since the use of phase-control which provides the desired number of impacts in a short time log, is obtained the optimization of the impact when taking advantage of the proper frequencies characteristics of the tree, vibrating the tree in resonance with the shaker (maximum energy transfer).

Due to the phase-controlled impact vibration which imparts vibration to the trees in their proper frequencies, two advantages are equally obtained regarding the other shakers, namely the vertical fruits fall, since there won't be observed great displacements of fruits or branches during the vibration, and the consequent fruits' fall in an area greater than the one from the tree's canopy, as well as and the preservation of the tree, since it doesn't only uses the forced vibration, but also the tree's natural frequencies to vibrate.

SHORT DESCRIPTION OF THE DRAWINGS

Now the invention will be detailed and with reference to the drawings, wherein.

The FIG. 1 is an illustration of the shaker with a partial cross-sectional view.

The FIG. 2 is an illustration of the linear vibration generating eccentric masses.

The FIG. 3 represents the longitudinal sectional view of the shaker's frontal part in which it produces the phase-controlled impact vibration.

The FIG. 4 is an illustration of the shaker and indicators showing the shaker's vibration direction as well as the spinning allowed by the shaker clamps.

The FIG. 5 is an illustration of the clamp/trunk or limb set.

DESCRIPTION OF THE PREFERRED EMBODIMENT

Figure 1:
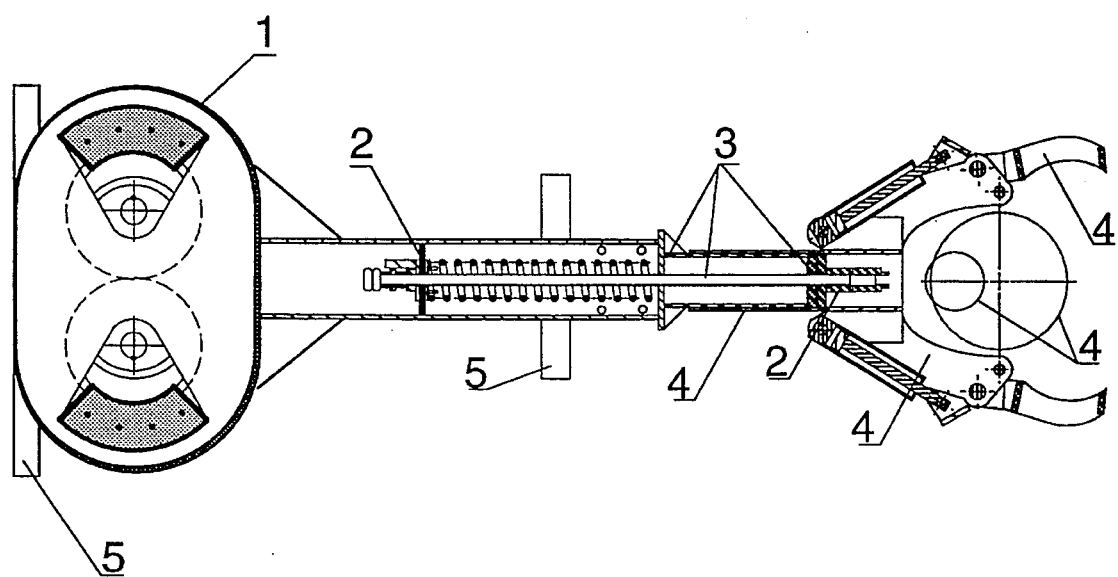

The mechanical shaker disclosed comprises three sets of constructive elements, namely the vibrator set, the spring set with the guiding system, and the clamp/trunk or limb set, corresponding in FIG. 1 (1) to the vibrator set, (2) to the spring set, (3) to the guiding system, and (4) to the clamp/trunk or limb set, with the mechanical shaker suspended in a metallic structure (5) by metallic chains, cynoblocks or pendent bars oriented in such a way that the vibration is not transmitted to the suspending structure and consequently to the self-propelled vehicle that carries it.

This shaker that can have a mechanical, hydraulic or pneumatic power transmission, generating phase-controlled linear impact vibrations. The linear impact vibration is provided by vibrator set (1), by means of two sets of eccentric masses (6) (FIG. 2) geared by two gearwheels, (7) perpendicularly to the vibration direction, so that the centrifugal force exerted by the two sets of eccentric masses will be mutually cancelled in the component perpendicular to the vibration direction, and added in the component of the vibration direction.

The guiding system is composed by 3 main parts:

1) the internal guiding system or the piston (10) with the metallic bumper at the end (19) and is strongly connected to the vibrator set.

2) the external guiding system or the jacket (9) which top is attached to the metallic bumper of the clamp (14).

3) The spring guiding long screw (18) that compresses the spring giving a recuperating tension between vibrator set and clamp/trunk or limb set, each time there is an effective displacement between the two sets caused by an impact. To prevent the nut (13) to unscrew avoiding a deregulation of spring base tension a grip clip is used (20).

Alternatively one can use two external parallel springs with screws (21) that traction the springs (22) under the same situation as discussed above.

The clamp/trunk or limb set is composed by:

a metallic bumper that receives the impacts from the vibrator. This bumper is attached to a fork that holds inside the regulation system (13) or (24) and at the top of it a set of vulcanized traction leaf chains (16) that are linked at both end of it. Also at the end of fork a pair of asymmetric vulcanized grips (FIG. 3) (15) and (FIG. 5) (15) that hold and pull back the tree (25) in the recuperating force due to spring tension. Each grip perform as a lever with an hydraulic or pneumatic actuator at one top (17).

Figure 9A:
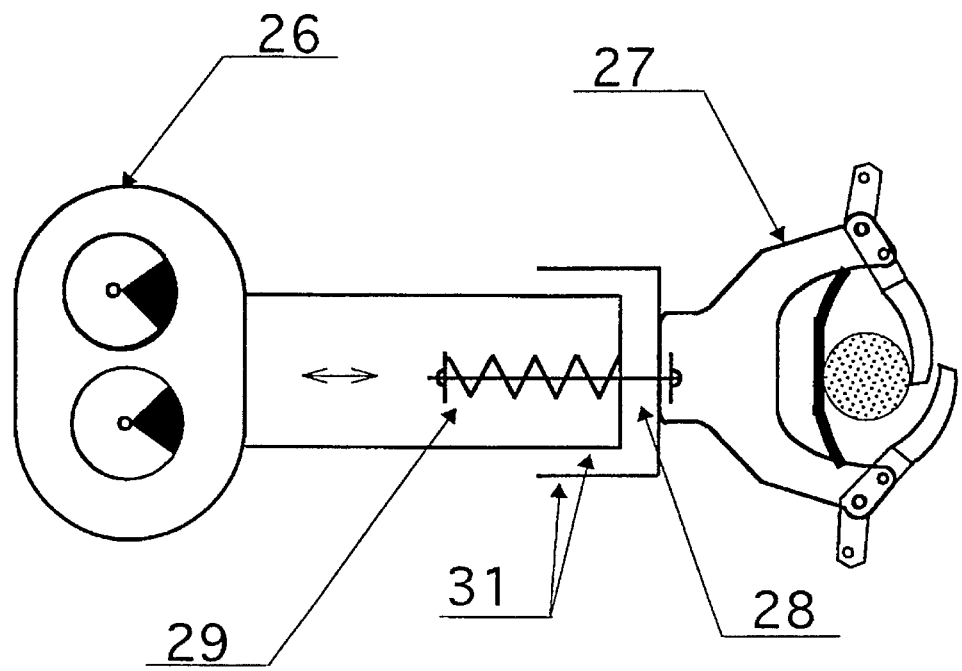
FIG. 9 shows a schematic simplified view of the three sets that compose the mechanical shaker, allowing a easier understanding of the phase-controlled impact shaking.
Figure 9B:
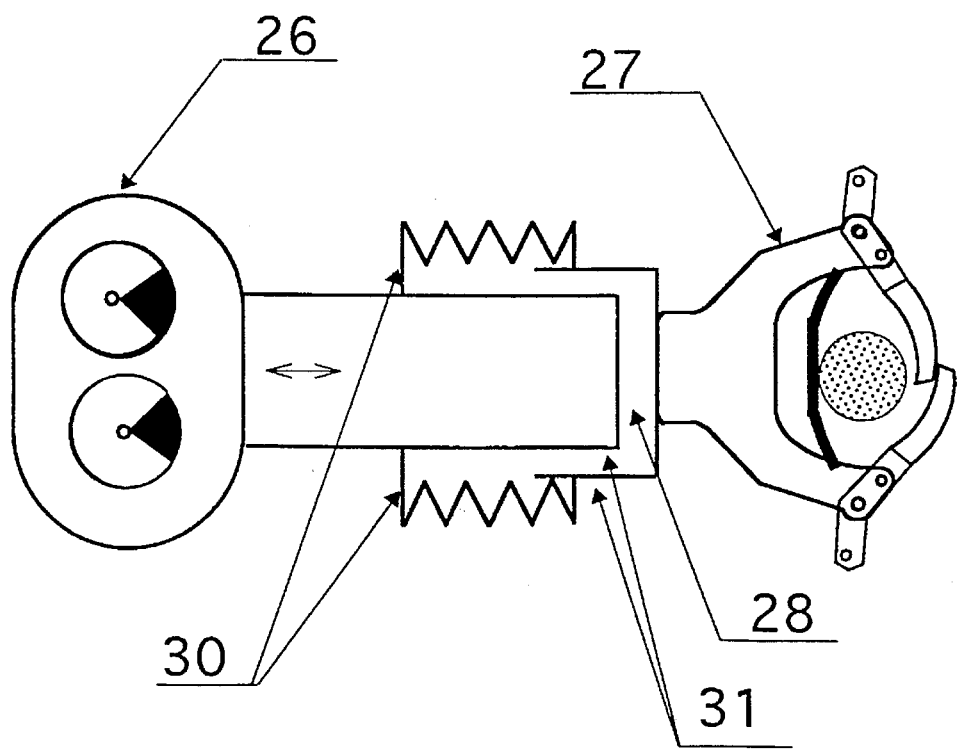

The phase-control is achieved by means of an adjustable spring set (FIG. 9) (29) or (30) that connects the vibrator set (FIG. 9) (26) to the clamp/trunk or limb set (FIG. 9) (27) through the guiding system (FIG. 9) (31). The clamp grasps the trunk or limb, in such a way that each impact given by the vibrator set in the clamp/trunk or limb set (the clamp remains strongly attached to the trunk or limb) carries a displacement of the last set regarding the vibrator set (see the space between the two sets indicated in (FIG. 9) (28) were the impact is to be produced, producing a spring recovering tension in the guiding system. In this way, the vibration of the vibrator set will have a phase angle regarding the vibration of the clamp/trunk or limb set, between 0° and 360°. It is intended that the two sets vibrate in resonance.

Figure 2:
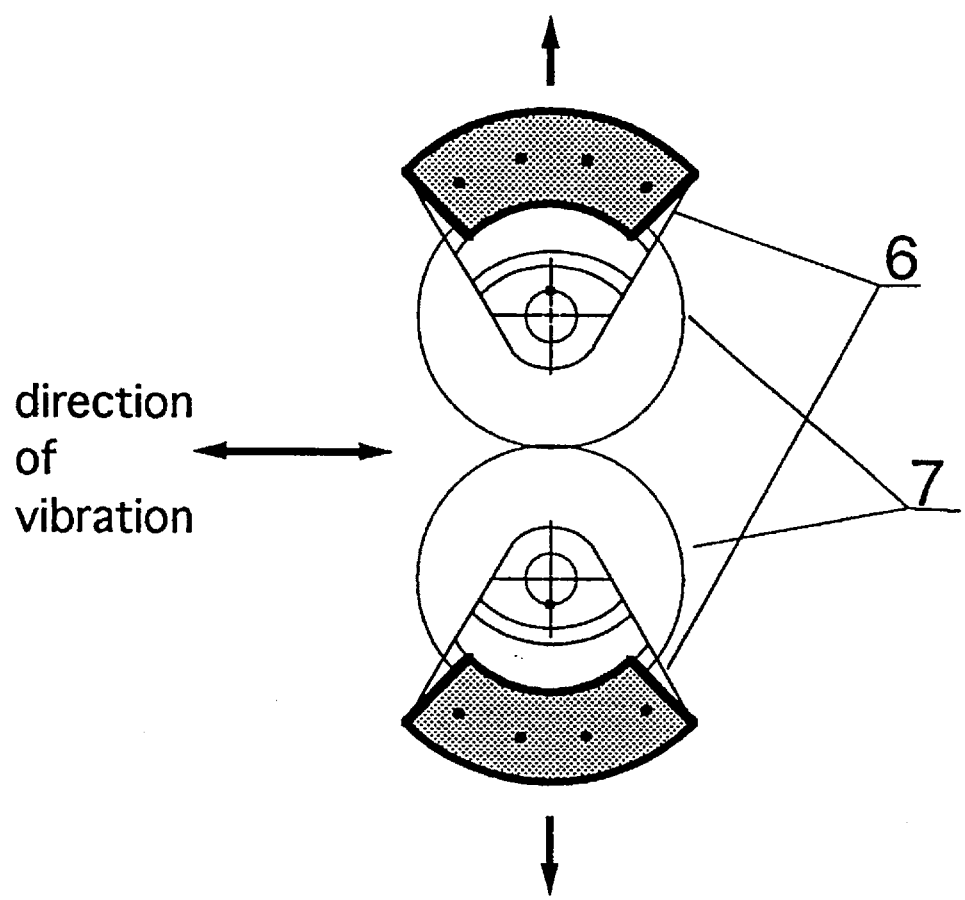

The transmission of power to the vibrator set is carried out by means of a mechanical, hydraulic or pneumatic system connected to the power-take-of driving shaft of the tractor or motorized vehicle that carries it. One of the eccentric masses set receives the power transmitted by a hydraulic or pneumatic engine or telescopic cardan, and, in its turn, transmits the power to the other eccentric masses set by means of gearwheels with equal diameters (FIG. 2), and located respectively in the axis of each eccentric masses set. Each eccentric masses set is supported by a pair of bushings. The gearwheels are responsible for the symmetry of position of the eccentric masses, providing the mutual annulment of the centrifugal force in the component perpendicular in relation to the vibration direction (FIG. 2).

The set of gearwheels and eccentric masses is contained inside a tight box with a visit door to carry out the lubrication and piece exchange (11) (FIG. 4), (1) (FIG. 1).

The shaker vibration parameters, the vibration amplitude, the vibration frequency, the impact force, and the vibration phase-control between the vibrator set and the clamp/trunk or limb set, are adjustable according to the kind of tree and the sensibility of the user. The amplitude depends on the mass relation between the eccentric masses and the mechanical shaker's mass. The vibration frequency depends on the rotation of vehicle's motor that carries the mechanical shaker, being adjustable in function of the operator's sensibility and the kind of tree. The impact force depends on the vibration frequency and on the weight of the eccentric masses. The phase-control depends on the tension of the spring set.

Figure 4:
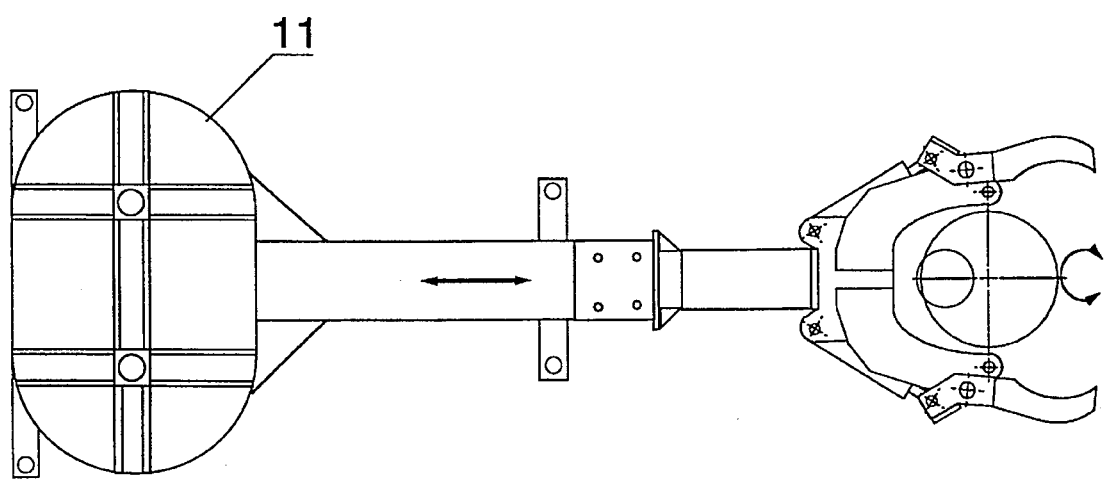
Figure 5:
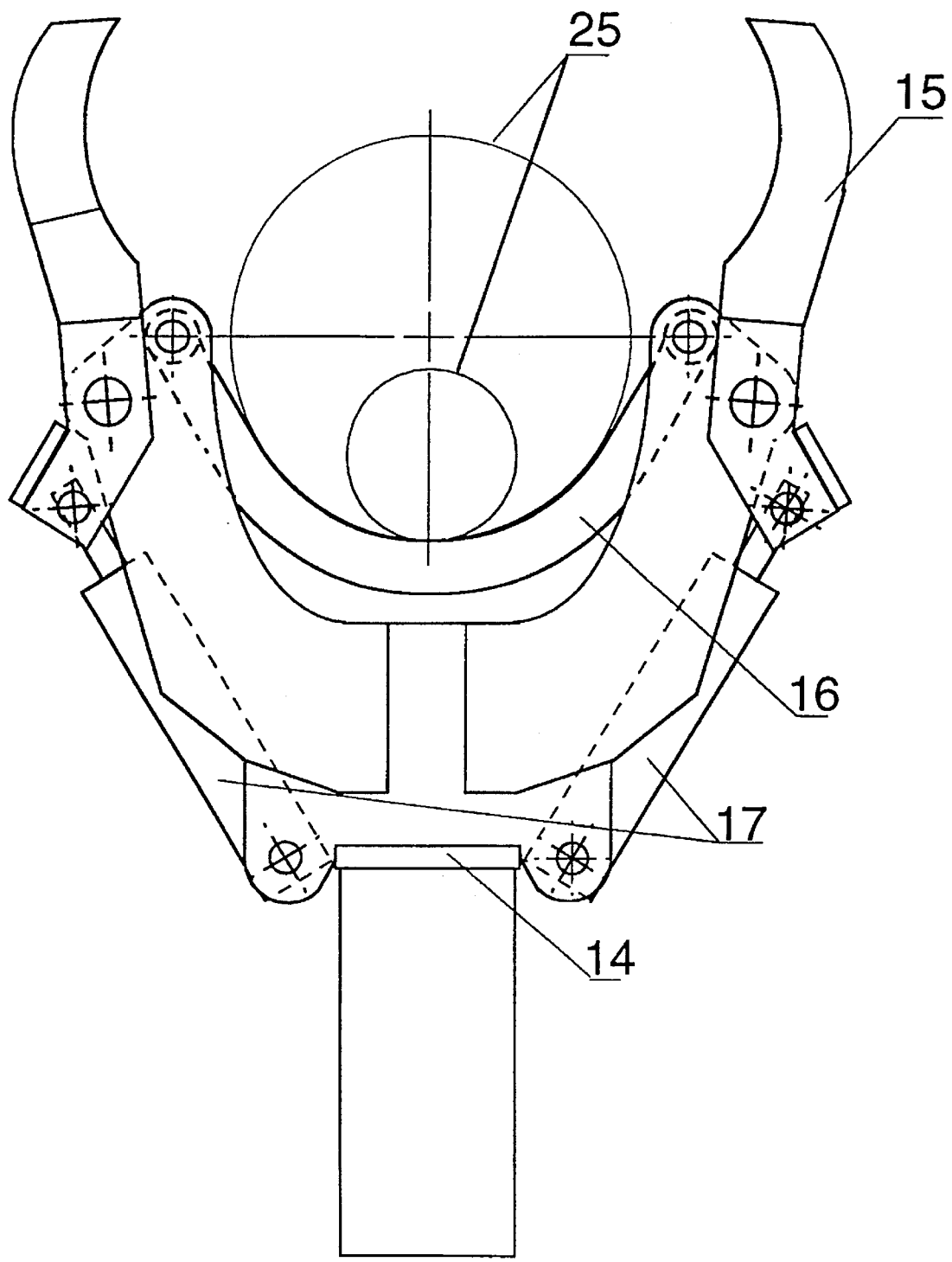

The impact is obtained in the linear movement of the shaker set regarding the clamp/trunk or limb set. This receives the impact from the vibrator set by the metallic bumper (FIG. 3) (19) on its metallic bumper (FIG. 3) (14) that holds the external guiding system or jacket, coupling the vibrator set to the clamp/trunk or limb set (FIG. 5). The guiding system has two functions: serve as a telescopic guide to the impact of the vibrator set in the clamp/trunk or limb set (FIG. 5), and simultaneously to provide the anatomic adaption of the clamp to the trunk or limb, spinning over the impact axle (FIG. 4).

Figure 3:
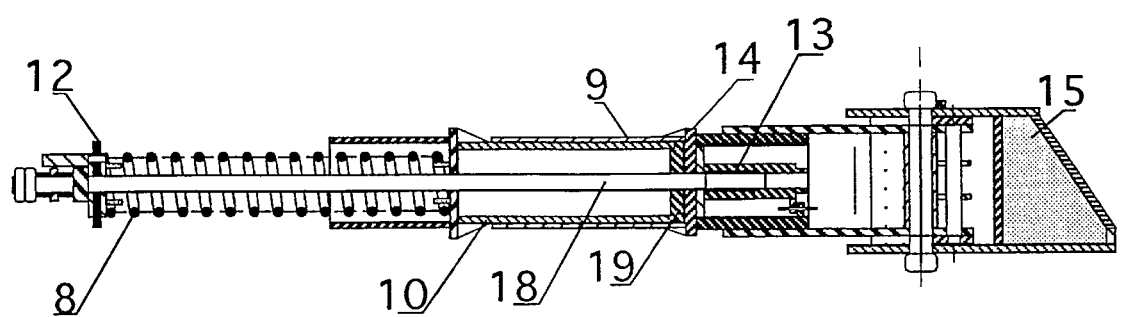

The phase-control is carried out by the regulation of the tension of the springs which pulls the clamp/trunk or limb set regarding the vibrator set (FIG. 3). One can use a central spring (12) (FIG. 3) or several external springs, parallel to the vibration axle. The tension regulation of the springs is mechanical, hydraulic or pneumatic (13) (FIG. 3). The regulation can be instantaneous or pre-established according with the tree's standard, since the kind of tree regulates the frequency of resonance of the vibration from the vibrator set regarding to the clamp/trunk or limb set.

The clamp has the function of strongly grasping the mechanical shaker to the tree, and supporting the impact of the vibrator set, preventing, simultaneously, the damage of the trunk or limb (FIG. 5). The clamp has the form of a fork and includes a set of vulcanized asymmetric grips (15) (FIGS. 3 and 5), a vulcanized chains set (16) and an hydraulic or pneumatic system (17). This system acts over the grips set comprised by two vulcanized asymmetric grips that provide a tight attachment to the tree. The vulcanized chains set functions as the adjustment of the clamp to the embodiment of the trunk or limb allowing a good distribution of the impact force produced by the vibrator set so that it is exerted an uniform pressure on the trunk or limb, thus avoiding their damage. The vulcanized asymmetric grips have the function to traction the tree back to initial 0 displacement position. The traction force is made by the traction spring, being the tension proportional to the existing phase angle of vibration between vibrator and clamp/trunk or limb sets. Both the grips and the chains have a vulcanized rubber cover that avoids the tree's bark damage. The clamp is interchangeable, and has an aperture dimension in function of the kind of trees to which to the mechanical shaker is directed (FIG. 5).

According to the kind of trees and the kind of intended vibration, the shaker allows a vibration of the tree's main trunk or limb within 0 to 5 m from the soil.

The mechanical shaker can be coupled in the front, rear or sidewards in the tractor or motorized vehicle. It can equally vibrate in a line perpendicular to the displacement of the tractor or vehicle, in such a manner that facilitates the vibration on trees, as well as to use the transmission of hydraulic pressure, available in agricultural tractors and motorized vehicles such as retrodiggers, front loaders, motorcultivators, dumpers, etc., using hydraulic implements.

Operation

At an impact driven by the vibrator set (FIG. 1) (1) and (FIG. 9) (26) in the metallic bumper (14) of the clamp/trunk or limb set (27), the tree will bend forward. That means the clamp/trunk or limb set will displace forward. Meanwhile the vibrator set is displacing backwards which means an increasing amplitude between the metallic bumper (14) from clamp/trunk or limb set and metallic bumper (19) from internal guiding system (or piston) (10) resulting in a recuperating traction force from the spring tending to recuperate both clamp/trunk or limb set and vibrator set to initial 0 displacement position. Because the vibrator set vibrates in resonance with clamp/trunk or limb set, both entities will shock each other at initial 0 displacement position but with vibrator set having a strong driving force due to its eccentric masses rotation, transferring once again energy to the clamp/trunk or limb set.

Figure 6:
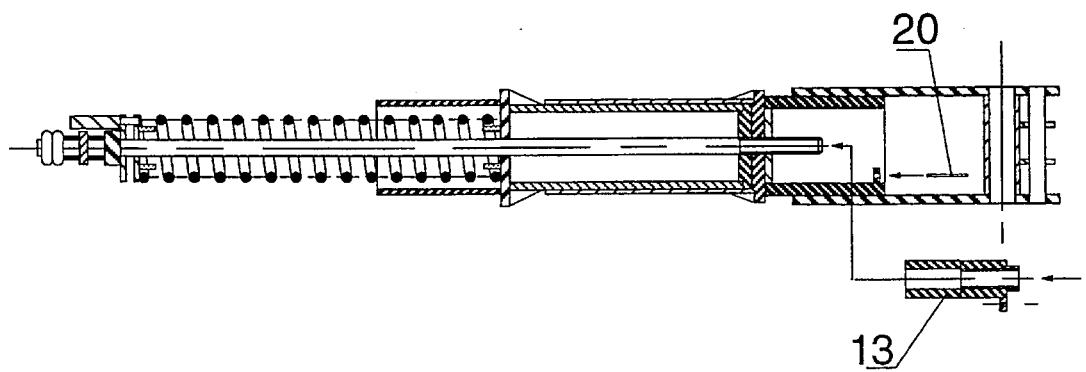
FIG. 6 shows a sectional view of the shaker's frontal part in which is illustrated the mechanical regulation (screw and nut) of the central spring base tension.
Figure 7:
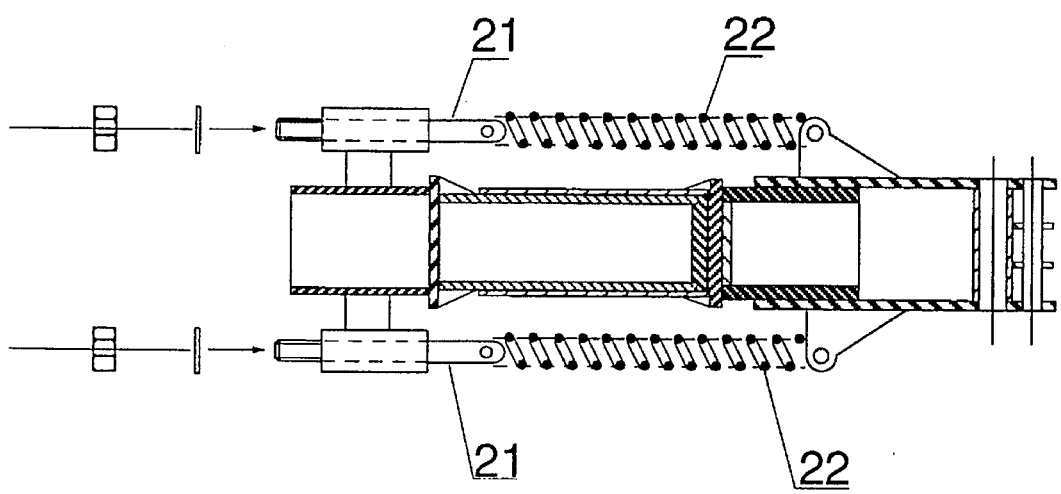
FIG. 7 shows a parallel external spring set, alternative to a one central spring, spring set.
Figure 8:
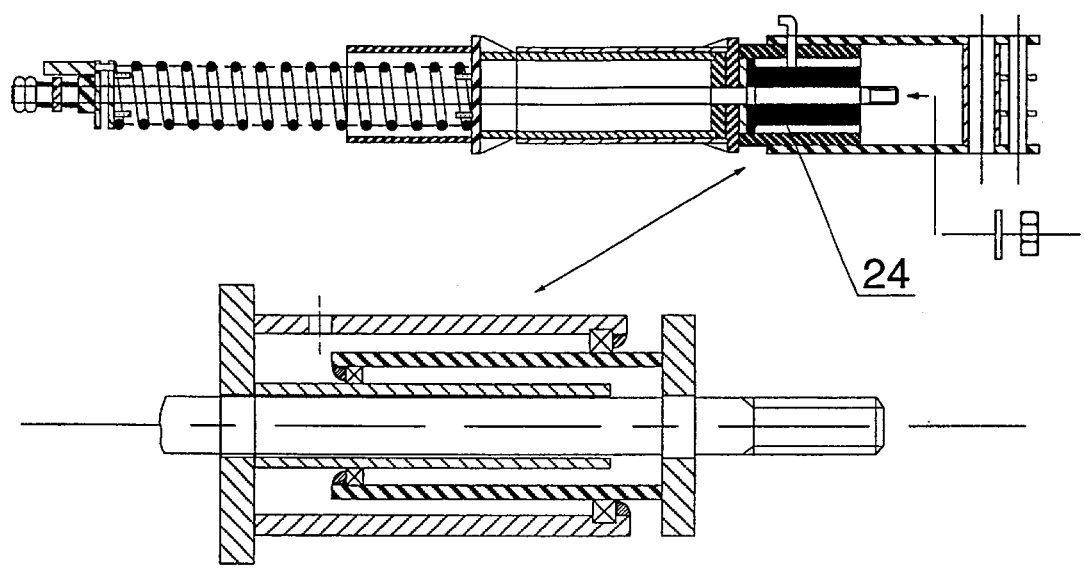
FIG. 8 shows a sectional view of the shaker's frontal part in which is illustrated the hydraulic or pneumatic regulation of the central spring base tension.

The spring recuperating force is proportional to the displacement between vibrator set and clamp/trunk or limb set, but as an adjustable base tension that can be pre-set mechanically by a nut/screw regulation (FIG. 6)(13) and (20) before the operator begins to shake the orchard, or is instantaneously regulated by means of hydraulic or pneumatic actuators (by means of an hydraulic fluid or air command) (FIG. 8) (24) that give a desired base tension before shaking a small limb or a big trunk. This is of particular importance when one has to shake non homogeneous (in tree age and configuration) orchards where the operator has to adjust the base tension frequently each time as to shake small limbs alternately with major trunks that have very different stiffnesses and very different natural frequencies.

To change the forks is to unscrew the nut (13)—for the central spring alternative—allowing the clamp to glide through the guiding system while (1), (3), (8), (12) and (18) stay attached together, the clamps (4), (13), and (20) or (24) are taken away to change by a different size clamp according to orchard configuration or type of fruit to be harvested.

What is claimed is:

1. An agricultural mechanical shaker for harvesting fruit by providing phase-controlled linear impact vibrations to a tree, said shaker comprising:

a linear vibrator set including a plurality of rotating eccentric masses for initiating said vibrations, the vibrator set having an end and including a first metallic bumper at said end;

a clamp set for linking said shaker to a trunk or limb of said tree, said clamp set including a second metallic bumper receiving direct impacts from said first metallic bumper;

a spring set interconnecting said linear vibrator set with said clamp set, said spring set including a guiding long screw and a helical spring mounted around said guiding long screw such that, when said first metallic bumper and said second metallic bumper become separated, said spring set biases said second metallic bumper toward said first metallic bumper.

2. An agricultural mechanical shaker as claimed in claim 1, having means for having two distinct entities vibrating in resonance or with a variable phase angle between them, and one of said distinct entities being said vibrator set and another one of said two distinct entities being said clamp set.

3. An agricultural mechanical shaker as claimed in claim 1 where there is no physical link between said clamp set and said vibrator set except a traction spring set to traction said vibrator set and said clamp set entities joining both sets together and a guiding system to obligate said vibrator set to give the impacts always on the same place in the said clamp set.

4. An agricultural mechanical shaker as claimed in claim 3, wherein said spring set interconnects said vibrator set with said clamp set through said guiding long screw with means for an adjustable spring base tension, said impacts produce a displacement of said clamp set relative to said vibrator set resulting in a recuperating tension in said spring set, and providing for a phase angle between said vibration of said vibrator set and said clamp set; said spring set including regulating means for setting a base tension, and determining said phase angle between 0 and 360 degree.

5. An agricultural mechanical shaker as claimed in claim 4 wherein said adjustable base tension is controlled by means of a mechanical nut/screw regulation or by means of an hydraulic or pneumatic actuator, and wherein said base tension is instantaneously adjustable.

6. An agricultural mechanical shaker as claimed in claim 4 wherein said adjustable base tension is controlled by means of a mechanical nut/screw regulation or by means of an hydraulic or pneumatic actuator and wherein base tension is pre-settable.

7. An agricultural shaker as claimed in claim 1 wherein said clamp set includes forks comprising a chain and a set of controlled grips for attaching said clamp set to said tree.

8. An agricultural shaker as claimed in claim 7, wherein said chain and said grips are vulcanized for reducing damage to said tree.

9. An agricultural shaker as claimed in claim 7, wherein said controlled grips are hydraulically or pneumatically operated.

10. An agricultural shaker as claimed in claim 1, wherein said vibrations are adjustable in amplitude, frequency and impact force.

* * * * *